US012795539B2

(12) United States Patent
Zhao et al.

(10) Patent No.: US 12,795,539 B2
(45) Date of Patent: Nov. 10, 2026

(54) SERVICE DATA TRANSMISSION METHOD AND RELATED DEVICE

(71) Applicant: HUAWEI TECHNOLOGIES CO., LTD., Guangdong (CN)

(72) Inventors: Yongjie Zhao, Xi'an (CN); Shuailei Fang, Xi'an (CN); Wei Luo, Shenzhen (CN); Bei Xu, Xi'an (CN)

(73) Assignee: Huawei Technologies Co., LTD., Shenzhen (CN)

(*) Notice: Subject to any disclaimer, the term of this patent is extended or adjusted under 35 U.S.C. 154(b) by 320 days.

(21) Appl. No.: 18/574,231

(22) PCT Filed: Sep. 26, 2021

(86) PCT No.: PCT/CN2021/120746

§ 371 (c)(1),
(2) Date: Dec. 26, 2023

(87) PCT Pub. No.: WO2023/272982

PCT Pub. Date: Jan. 5, 2023

(65) Prior Publication Data

US 2024/0323841 A1 Sep. 26, 2024

(30) Foreign Application Priority Data

Jun. 29, 2021 (CN) ......................... 202110727498.1

(51) Int. Cl.
*H04W 84/18* (2009.01)
*H04W 52/02* (2009.01)
*H04W 76/15* (2018.01)

(52) U.S. Cl.
CPC ... *H04W 52/0225* (2013.01); *H04W 52/0216* (2013.01); *H04W 76/15* (2018.02); *H04W 84/18* (2013.01)

(58) Field of Classification Search
CPC ...... H04W 74/12; H04W 76/15; H04W 84/18
(Continued)

(56) References Cited

U.S. PATENT DOCUMENTS 8,866,401 B2 10/2014 Shearer et al.
8,935,547 B2 1/2015 Theocharous et al.
(Continued)

FOREIGN PATENT DOCUMENTS

CN 109890022 A 6/2019
CN 110891259 A 3/2020
CN 111694402 A 9/2020

OTHER PUBLICATIONS

Extended European Search Report in European Appln. No. 21947910.2, mailed on Oct. 8, 2024, 15 pages.
(Continued)

*Primary Examiner* — Angel T Brockman
(74) *Attorney, Agent, or Firm* — Fish & Richardson P.C.

(57) ABSTRACT

The present disclosure relates to service data transmission methods and devices. One example method includes establishing a first Bluetooth logical channel with a first main control chip of a wearable device and a second Bluetooth logical channel with a second main control chip of the wearable device, where the first main control chip and the second main control chip have different processing capabilities and energy consumption, and sending, based on an interaction channel corresponding to a service, service data to the first main control chip through the first Bluetooth logical channel or to the second main control chip through the second Bluetooth logical channel.

20 Claims, 6 Drawing Sheets

(58) Field of Classification Search
USPC .......................................................... 370/311
See application file for complete search history.

(56) References Cited

U.S. PATENT DOCUMENTS

| | | | | |
|---|---|---|---|---|
| 9,256,268 | B2 | 2/2016 | Wang et al. | |
| 9,372,524 | B2 | 6/2016 | Sistla et al. | |
| 9,456,418 | B2 | 9/2016 | Lee et al. | |
| 9,686,840 | B2 | 6/2017 | Lydecker et al. | |
| 9,760,409 | B2 | 9/2017 | Sistla et al. | |
| 10,123,274 | B2 | 11/2018 | Lee et al. | |
| 10,334,699 | B2 | 6/2019 | Lydecker et al. | |
| 10,345,887 | B2 | 7/2019 | Hsiao et al. | |
| 10,541,116 | B2 | 1/2020 | Zong | |
| 2014/0195833 | A1 | 7/2014 | Wang et al. | |
| 2016/0150537 | A1* | 5/2016 | Jung | H04W 8/005 455/452.1 |
| 2016/0224778 | A1* | 8/2016 | Kim | G06F 21/35 |
| 2017/0322616 | A1 | 11/2017 | Hsiao et al. | |
| 2021/0152643 | A1 | 5/2021 | Mathur et al. | |
| 2022/0303746 | A1* | 9/2022 | Liu | H04W 84/18 |

OTHER PUBLICATIONS

International Search Report and Written Opinion in International Appln. No. PCT/CN2021/120746, mailed on Mar. 28, 2022, 15 pages (with English translation).

* cited by examiner

| Sequence number | Service name | Watch processing chip | Interaction channel |
|---|---|---|---|
| 1 | WearEngine | AP | First Bluetooth logical channel |
| 2 | Workout | MCU + AP | Dynamic Bluetooth logical channel |
| 3 | Music | AP | First Bluetooth logical channel |
| 4 | Message notification | MCU + AP | Dynamic Bluetooth logical channel |
| 5 | Others | Not specified | Second Bluetooth logical channel |

FIG. 4

| Sequence number | Service name | Watch processing chip | Service processing policy |
|---|---|---|---|
| 1 | Exercise | MCU + AP | An AP performs processing if a map is enabled by a user and an MCU performs processing if another function is enabled |
| 2 | Message notification | MCU + AP | Within one minute, the user raises the wrist or presses a key to turn on a screen, and the MCU displays a message in full screen. After one minute, the user needs to enter a message center of the AP to view the message, and the AP performs processing |

FIG. 5

SERVICE DATA TRANSMISSION METHOD AND RELATED DEVICE

CROSS-REFERENCE TO RELATED APPLICATIONS

This application is a national stage of International Application No. PCT/CN2021/120746, filed on Sep. 26, 2021, which claims priority to Chinese Patent Application No. 202110727498.1, filed on Jun. 29, 2021. Both of the aforementioned applications are hereby incorporated by reference in their entireties.

TECHNICAL FIELD

This application relates to the field of terminal technologies, and in particular, to a service data transmission method and a related device.

BACKGROUND

Currently, a terminal device, for example, a wearable device such as a watch or glasses, usually uses a dual-system structure to provide richer functions and better user experience. A device includes two main control chips. One main control chip has a strong processing capability and high energy consumption, for example, an application processor (Application Processor, AP), and the other main control chip has a weak processing capability and low energy consumption, for example, a micro control unit (Micro Control Unit, MCU). In a collaborative application scenario between devices, if another device frequently wakes up a main control chip with high energy consumption in a device to process a distributed collaborative service, standby time of the device is severely affected.

SUMMARY

Embodiments of this application disclose a service data transmission method and a related device, so that a channel for transmitting service data through a mobile phone to a wearable device can be determined, thereby reducing a quantity of times of waking up a main control chip with high energy consumption in the wearable device, and improving standby time of the wearable device.

A first aspect of this application discloses a service data transmission method. The method is applied to a mobile phone, and the method includes: establishing a first Bluetooth logical channel with a first main control chip of a wearable device and a second Bluetooth logical channel with a second main control chip of the wearable device, where the first main control chip and the second main control chip have different processing capabilities and energy consumption; and sending, based on an interaction channel corresponding to a service, service data to the first main control chip through the first Bluetooth logical channel, or to the second main control chip through the second Bluetooth logical channel.

According to the service data transmission method provided in this embodiment of this application, the mobile phone may determine a channel for transmitting the service data to the wearable device, to reduce a quantity of times of waking up a main control chip with high energy consumption in the wearable device, and improve standby time of the wearable device.

In some optional implementations, before the sending, based on an interaction channel corresponding to a service, service data to the first main control chip through the first Bluetooth logical channel, or to the second main control chip through the second Bluetooth logical channel, the method further includes: receiving an interaction channel policy sent by the second main control chip through the second Bluetooth logical channel; and determining, according to the interaction channel policy, the interaction channel corresponding to the service.

In some optional implementations, the sending, based on an interaction channel corresponding to a service, service data to the first main control chip through the first Bluetooth logical channel, or to the second main control chip through the second Bluetooth logical channel includes: if the interaction channel corresponding to the service is a dynamic Bluetooth logical channel, sending the service data to the first main control chip through the first Bluetooth logical channel, or to the second main control chip through the second Bluetooth logical channel based on statuses of the first main control chip and the second main control chip; if the interaction channel corresponding to the service is the first Bluetooth logical channel, sending the service data to the first main control chip through the first Bluetooth logical channel; or if the interaction channel corresponding to the service is the second Bluetooth logical channel, sending the service data to the second main control chip through the second Bluetooth logical channel.

In some optional implementations, if the interaction channel corresponding to the service is a dynamic Bluetooth logical channel, the method further includes: sending a status query instruction to the second main control chip through the second Bluetooth logical channel; and receiving status information of the first main control chip and the second main control chip that is returned by the second main control chip.

In some optional implementations, the sending the service data to the first main control chip through the first Bluetooth logical channel, or to the second main control chip through the second Bluetooth logical channel based on statuses of the first main control chip and the second main control chip includes: if the first main control chip is in a sleep state and the second main control chip is in a non-high-load state, sending the service data to the second main control chip through the second Bluetooth logical channel; if the first main control chip is in a running state, sending the service data to the first main control chip through the first Bluetooth logical channel; or if the first main control chip is in a sleep state and the second main control chip is in a high-load state, temporarily storing the service data.

In some optional implementations, the establishing a first Bluetooth logical channel with a first main control chip of a wearable device and a second Bluetooth logical channel with a second main control chip of the wearable device includes: establishing a physical channel with the first main control chip, and establishing the first Bluetooth logical channel with the first main control chip, where the first Bluetooth logical channel has a first channel number; receiving a second channel number sent by the first main control chip, where the second channel number identifies the second Bluetooth logical channel generated by the second main control chip; and connecting to the second Bluetooth logical channel based on the second channel number.

In some optional implementations, the first main control chip is an application processor, and the second main control chip is a micro control unit.

A second aspect of this application discloses a service data transmission method. The method is applied to a wearable device, the wearable device includes a first main control chip and a second main control chip, the first main control chip and the second main control chip have different processing capabilities and energy consumption, and the method includes:

establishing a first Bluetooth logical channel between the first main control chip and a mobile phone and a second Bluetooth logical channel between the second main control chip and the mobile phone; and receiving service data sent by the mobile phone to the first main control chip through the first Bluetooth logical channel, or to the second main control chip through the second Bluetooth logical channel.

In some optional implementations, after the receiving service data sent by the mobile phone to the first main control chip through the first Bluetooth logical channel, the method further includes:

The first main control chip processes the service data.

In some optional implementations, after the receiving service data sent by the mobile phone to the second main control chip through the second Bluetooth logical channel, the method further includes:

The second main control chip determines a service processing policy corresponding to the service data.

In some optional implementations, the determining a service processing policy corresponding to the service data includes:

determining the service processing policy based on statuses of the first main control chip and the second main control chip and/or a user operation on the wearable device.

In some optional implementations, the determining the service processing policy based on statuses of the first main control chip and the second main control chip and/or a user operation on the wearable device includes:

if the first main control chip is in a running state, or a quantity of to-be-processed tasks of the second main control chip is greater than or equal to a preset quantity, forwarding the service data to the first main control chip for processing.

In some optional implementations, the service data is a message, and the determining the service processing policy based on statuses of the first main control chip and the second main control chip and/or a user operation on the wearable device includes:

entering a message center of the first main control chip if detecting that a user views the message after preset time of receiving the message; and the second main control chip displays the message in full screen if detecting that the user wakes a screen of the wearable device within the preset time of receiving the message.

In some optional implementations, the service data is exercise data, and the determining the service processing policy based on statuses of the first main control chip and the second main control chip and/or a user operation on the wearable device includes:

if detecting that a user enables a map, the first main control chip processes the exercise data; or if detecting that the user enables another function of exercise, the second main control chip processes the exercise data.

A third aspect of this application discloses a computer-readable storage medium, including computer instructions. When the computer instructions are run on an electronic device, the electronic device is enabled to perform the service data transmission method according to the first aspect or the second aspect.

A fourth aspect of this application discloses an electronic device. The electronic device includes a processor and a memory, the memory is configured to store instructions, and the processor is configured to invoke the instructions in the memory, so that the electronic device performs the service data transmission method according to the first aspect or the second aspect.

A fifth aspect of this application discloses a chip system. The chip system is applied to an electronic device. The chip system includes an interface circuit and a processor. The interface circuit and the processor are interconnected through a line. The interface circuit is configured to: receive a signal from a memory of the electronic device, and send the signal to the processor, where the signal includes computer instructions stored in the memory. When the processor executes the computer instructions, the chip system performs the service data transmission method according to the first aspect or the second aspect.

A sixth aspect of this application discloses a computer program product. When the computer program product runs on a computer, the computer is enabled to perform the service data transmission method according to the first aspect or the second aspect.

A seventh aspect of this application discloses an apparatus. The apparatus has a function of implementing behavior of the electronic device in the method provided in the first aspect or the second aspect. The function may be implemented by hardware, or may be implemented by hardware executing corresponding software. The hardware or the software includes one or more modules corresponding to the function.

It should be understood that the computer-readable storage medium according to the third aspect, the electronic device according to the fourth aspect, the chip system according to the fifth aspect, the computer program product according to the sixth aspect, and the apparatus according to the seventh aspect all correspond to the methods according to the first aspect and the second aspect. Therefore, for beneficial effects that can be achieved by the computer-readable storage medium, the electronic device, the chip system, the computer program product, and the apparatus, refer to beneficial effects in the corresponding methods provided above. Details are not described herein again.

BRIEF DESCRIPTION OF DRAWINGS

FIG. 4 is a schematic diagram of an interaction channel policy between a first electronic device and a second electronic device;

FIG. 5 is a schematic diagram of a service processing policy of a second main control chip;

DESCRIPTION OF EMBODIMENTS

For ease of understanding, descriptions of some concepts related to embodiments of this application are provided as examples for reference.

It should be noted that, in this application, "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. In this specification, claims, and accompanying drawings of this application, terms "first", "second", "third", "fourth", and the like (if exist) are intended to distinguish between similar objects but do not necessarily indicate a specific order or sequence.

To better understand a service data transmission method and a related device provided in embodiments of this application, the following first describes an application scenario of the service data transmission method in this application.

Figure 1:
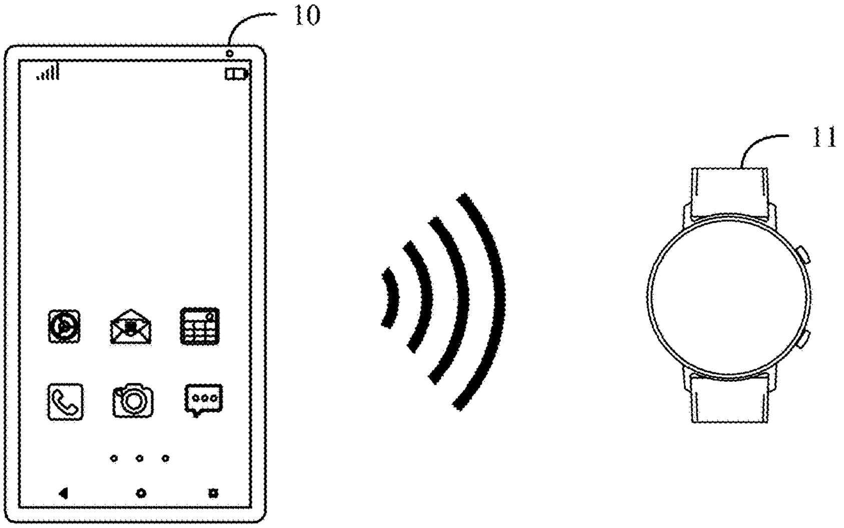
FIG. 1 is a schematic diagram of an application scenario of a service data transmission method according to an embodiment of this application.

FIG. 1 is a schematic diagram of an application scenario of a service data transmission method according to an embodiment of this application.

The service data transmission method provided in this embodiment of this application is applied to a first electronic device 10 and a second electronic device 11. The first electronic device 10 and the second electronic device 11 may be terminal devices. Particularly, the second electronic device 11 may be a wearable device. In the embodiment shown in FIG. 1, the first electronic device 10 is a mobile phone, and the second electronic device 11 is a watch. The first electronic device 10 and the second electronic device 11 perform a distributed collaborative service. The distributed collaborative service is a service that is processed collaboratively between electronic devices, for example, exercise, music, and message notification. For example, the first electronic device 10 (for example, the mobile phone) and the second electronic device 11 (for example, the watch) run a message notification service. After receiving a message, the first electronic device 10 displays the message on the second electronic device 11, to facilitate a user to view the message. For another example, the first electronic device 10 and the second electronic device 11 run an exercise service. When a user runs, the first electronic device 10 sends information such as a pace and a distance to the second electronic device 11, and the second electronic device 11 generates and displays a running route.

According to the service data transmission method provided in this embodiment of this application, in a process in which the first electronic device 10 and the second electronic device 11 perform the distributed collaborative service, the first electronic device 10 determines a channel for transmitting service data by the first electronic device 10 to the second electronic device 11, to reduce a quantity of times of waking up a main control chip with high energy consumption in the second electronic device 11, and improve standby time of the second electronic device 11.

Figure 2:
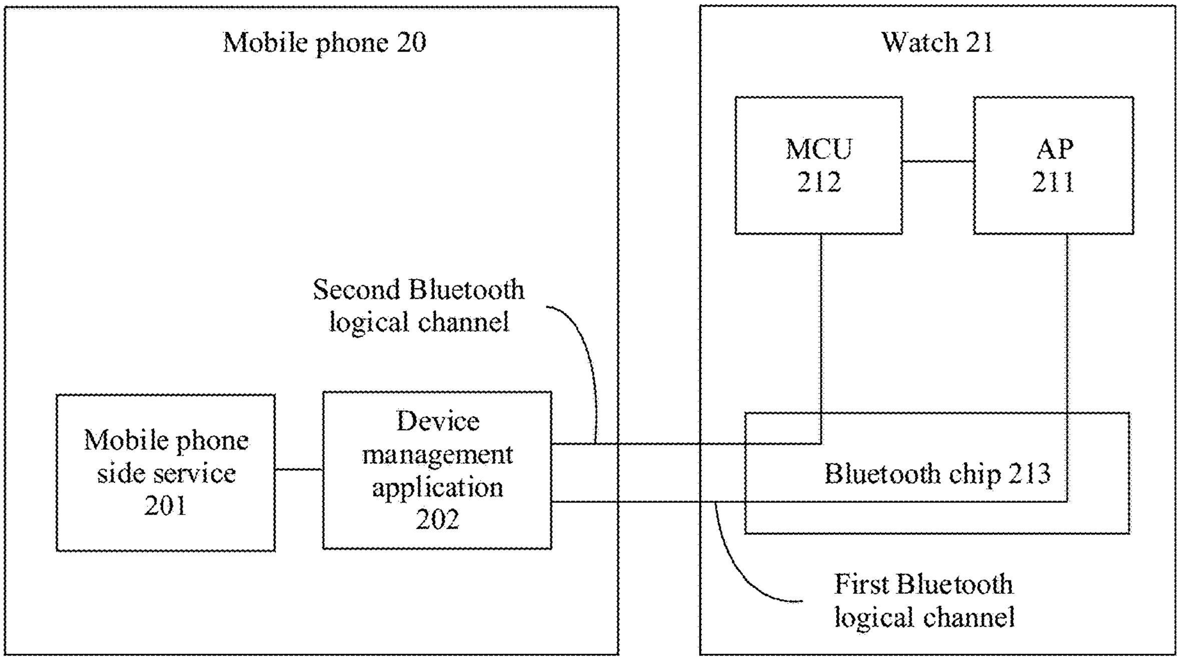
FIG. 2 is an architectural diagram of a mobile phone and a watch to which a service data transmission method according to an embodiment of this application is applied.

FIG. 2 is an architectural diagram of a mobile phone and a watch to which a service data transmission method according to an embodiment of this application is applied.

As shown in FIG. 2, the service data transmission method provided in this embodiment of this application is applied to a system including a mobile phone 20 and a watch 21. The mobile phone 20 includes a mobile phone side service 201 and a device management application 202. The watch 21 includes an application processor (Application Processor, AP) 211, a micro control unit (Micro Control Unit, MCU) 212, and a Bluetooth chip 213.

The mobile phone side service 201 is a distributed collaborative application running on the mobile phone 20. The mobile phone 20 interconnects with the watch 21 by running the mobile phone side service 201, to implement distributed collaboration. The mobile phone side service 201 may include a wearable capability (WearEngine), exercise, music, message notification, and the like.

The device management application 202 is configured to: establish a first Bluetooth logical channel with the AP 211 and a second Bluetooth logical channel with the MCU 212, determine a Bluetooth logical channel for sending the service data to the watch 21, and send the service data to the AP 211 or the MCU 212 through the determined Bluetooth logical channel.

The AP 211 is a control chip having a strong processing capability and high energy consumption in the watch 21, and may be referred to as a first main control chip. Energy consumption of the AP 211 during running is, for example, 100 mAH (100 milliamperes per hour), and energy consumption during standby is, for example, 5 mAH (5 milliamperes per hour). The AP 211 may process a distributed collaborative service that has a high performance requirement, for example, the WearEngine and the music, or may process a distributed collaborative service that has a low performance requirement, for example, the message notification.

A difference from the AP 211 is that the MCU 212 is a control chip having a weak processing capability and low energy consumption in the watch 21, and may be referred to as a second main control chip. Energy consumption of the MCU 212 during running is, for example, 50 mAH, and energy consumption during standby is, for example, 10 uAH (10 microamperes per hour). The MCU 212 may process a distributed collaborative service that has a low performance requirement, for example, the message notification.

The Bluetooth chip 213 is configured to: implement data transmission between the mobile phone 20 and the AP 211 through the first Bluetooth logical channel, and implement data transmission between the mobile phone 20 and the MCU 212 through the second Bluetooth logical channel. When the device management application 202 sends data (for example, the service data) to the AP 211 through the first Bluetooth logical channel, the Bluetooth chip 213 receives a channel number and data that correspond to the first Bluetooth logical channel and that are sent by the device management application 202, and forwards the data to the AP 211 based on the channel number corresponding to the first Bluetooth logical channel. When the device management application 202 sends data to the MCU 212 through the second Bluetooth logical channel, the Bluetooth chip 213 receives a channel number and data that correspond to the second Bluetooth logical channel and that are sent by the device management application 202, and forwards the data to the MCU 212 based on the channel number corresponding to the second Bluetooth logical channel.

When the AP 211 sends data to the mobile phone 20 through the first Bluetooth logical channel, the Bluetooth chip 213 receives the data sent by the AP 211, and sends the data to the mobile phone 20. When the MCU 212 sends data to the mobile phone 20 through the second Bluetooth logical channel, the Bluetooth chip 213 receives the data sent by the MCU 212, and sends the data to the mobile phone 20.

Currently, a Bluetooth protocol stack of the watch is deployed on the AP. Any Bluetooth event or message exchange wakes up the AP for processing. A Bluetooth-based service between the watch and mobile phone, for example, synchronizing health and fitness data on the watch to the mobile phone. Although the health and fitness service of the watch is processed through the MCU, the MCU cannot directly interact with the mobile phone through Bluetooth. The AP needs to be woken up for transfer processing. Each Bluetooth service delivery wakes up the AP, causing the AP to wake up frequently. As a result, overall standby time cannot reach an optimal value. Currently, the standby time of the watch in the industry is about two days.

According to the service data transmission method provided in this embodiment of this application, when the MCU meets a processing capability requirement, the service data is directly sent to the MCU without waking up the AP, so that energy consumption of the watch is reduced, and the standby time of the watch is improved.

In the embodiment shown in FIG. 2, the first electronic device is a mobile phone, the second electronic device is the watch, and the watch includes the AP, the MCU, and the Bluetooth chip. Based on the Bluetooth chip of the watch, the mobile phone establishes the first Bluetooth logical channel with the AP and the second Bluetooth logical channel with the MCU. It should be understood that, in another embodiment of this application, the first electronic device and the second electronic device may be other devices (for example, the first electronic device is a tablet computer, and the second electronic device is glasses). The first main control chip and the second main control chip in the second electronic device may be of other types, and a communication chip in the second electronic device may be of another type. Correspondingly, a first logical channel between the first electronic device and the first main control chip and a second logical channel between the first electronic device and the second main control chip may also be of other types.

Figure 3:
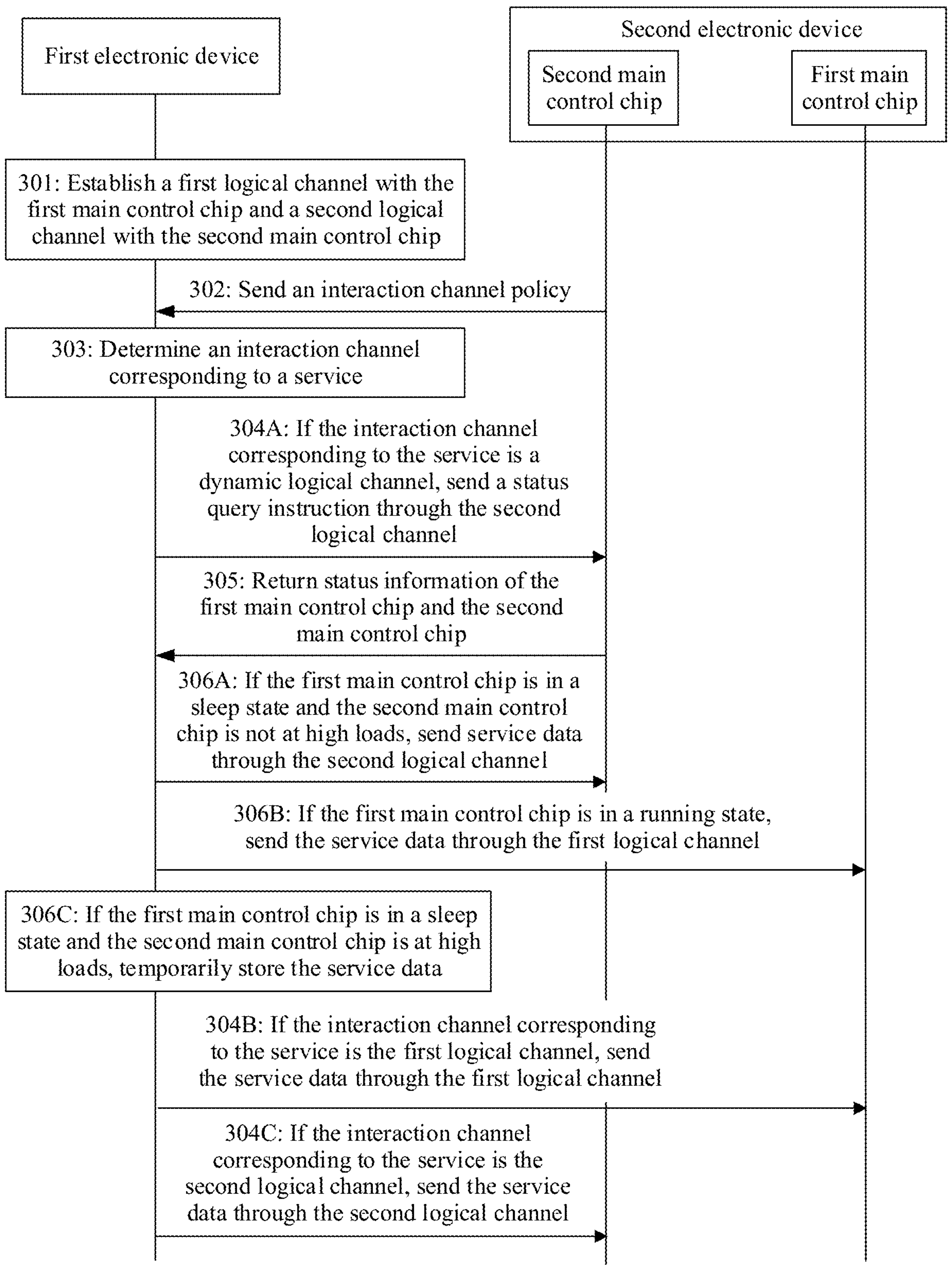
FIG. 3 is a flowchart of a service data transmission method according to an embodiment of this application.

FIG. 3 is a flowchart of a service data transmission method according to an embodiment of this application. The service data transmission method provided in this embodiment of this application is applied to a first electronic device and a second electronic device, and the second electronic device includes a first main control chip and a second main control chip. The first main control chip is a control chip that has a strong processing capability and high energy consumption, and the second main control chip is a control chip that has a weak processing capability and low energy consumption.

301: The first electronic device establishes a first logical channel with the first main control chip and a second logical channel with the second main control chip.

The first logical channel and the second logical channel are established based on a physical channel (for example, a Bluetooth physical channel) between the first electronic device and the second electronic device.

The first logical channel and the second logical channel may be identified by channel numbers. For example, a channel number of the first logical channel is 5, and a channel number of the second logical channel is 9.

An application scenario shown in FIG. 2 is used as an example. The first electronic device is a mobile phone, the second electronic device is a watch, the first main control chip is an AP, and the second main control chip is an MCU. The mobile phone establishes a first Bluetooth logical channel with the AP and a second Bluetooth logical channel with the MCU.

In an embodiment of this application, the first electronic device establishes the first logical channel with the first main control chip and the second logical channel with the second main control chip in the following manner: The first electronic device establishes a physical channel with the first main control chip, and establishes the first logical channel with the first main control chip, where the first logical channel has a first channel number. The first main control chip generates the second logical channel, where the second logical channel has a second channel number and corresponds to the second main control chip. The first main control chip notifies the first electronic device of the second channel number and the corresponding second main control chip. The first electronic device is connected to the second logical channel based on the second channel number, to establish a connection to the second main control chip.

The application scenario shown in FIG. 2 is still used as an example. The mobile phone establishes the first Bluetooth logical channel with the AP and the second Bluetooth logical channel with the MCU in the following manner: The mobile phone establishes a Bluetooth physical channel with the AP, and establishes the first Bluetooth logical channel with the AP, where the first Bluetooth logical channel has a first Bluetooth channel number. The AP generates the second Bluetooth logical channel, where the second Bluetooth logical channel has a second Bluetooth channel number and corresponds to the MCU. The AP notifies the mobile phone of the second Bluetooth channel number and the corresponding MCU. The mobile phone connects to the second Bluetooth logical channel based on the second Bluetooth channel number, to establish a connection to the MCU.

In an embodiment of this application, the second electronic device includes a communication chip (for example, a Bluetooth chip, as shown in FIG. 2, the communication chip is configured to implement short-range data transmission), and data transmission between the first electronic device and the first main control chip through the first logical channel and data transmission between the first electronic device and the second main control chip through the second logical channel are implemented through the communication chip.

When the first electronic device sends data (for example, service data) to the first main control chip through the first logical channel, the first electronic device may send the first channel number and the data to the communication chip, and the communication chip forwards the data to the first main control chip based on the first channel number. When the first electronic device sends the data to the second main control chip through the second logical channel, the first electronic device may send the second channel number and the data to the communication chip, and the communication chip forwards the data to the second main control chip based on the second channel number.

When the first main control chip sends the data to the first electronic device through the first logical channel, the first main control chip may send the data to the communication chip, and the communication chip sends the data to the first electronic device. When the second main control chip sends the data to the first electronic device through the second logical channel, the second main control chip may send the data to the communication chip, and the communication chip sends the data to the first electronic device.

302: The second main control chip sends an interaction channel policy to the first electronic device through the second logical channel.

The application scenario shown in FIG. 2 is still used as an example. The MCU sends the interaction channel policy to the mobile phone through the second Bluetooth logical channel.

The interaction channel policy is used to describe interaction channels used by different services between the first electronic device and the second electronic device.

In an embodiment of this application, it is defined according to the interaction channel policy that an interaction channel corresponding to a service includes the first logical channel, the second logical channel, and a dynamic logical channel. If the interaction channel corresponding to the service is the first logical channel, it indicates that the service data is transmitted to the first main control chip through the first logical channel. If the interaction channel corresponding to the service is the second logical channel, it indicates that the service data is transmitted to the second main control chip through the second logical channel. If the interaction channel corresponding to the service is the dynamic logic channel, it indicates that the service data is transmitted to the first main control chip through the first logic channel or to the second main control chip through the second logic channel.

FIG. 4 is a schematic diagram of an interaction channel policy between a first electronic device and a second electronic device. FIG. 4 is described by using the application scenario shown in FIG. 2 as an example. As shown in FIG. 4, a distributed collaborative service between the mobile phone and the watch includes a wearable capability (WearEngine), exercise, music, message notification, and the like. An interaction channel corresponding to the wearable capability is the first Bluetooth logical channel, an interaction channel corresponding to the exercise is a dynamic Bluetooth logical channel, an interaction channel corresponding to the music is the first Bluetooth logical channel, an interaction channel corresponding to the message notification is the dynamic Bluetooth logical channel, and an interaction channel corresponding to another service (a service other than the wearable capability, the exercise, the music, or the message notification) is the second Bluetooth logical channel.

FIG. 4 further lists main control chips (a column of a watch processing chip in the figure) corresponding to different services, to indicate the main control chips for processing the service data. For example, a main control chip corresponding to the wearable capability (WearEngine) is the AP, main control chips corresponding to the exercise are the MCU+the AP, a main control chip corresponding to the music is the AP, main control chips corresponding to the message notification are the MCU+the AP, and no corresponding main control chip is specified for the another service.

301 and 302 may be performed after the first electronic device is paired with the second electronic device, to prepare for service data transmission between the first electronic device and the second electronic device.

303: When the service data is to be sent to the second electronic device, the first electronic device determines the interaction channel corresponding to the service.

The application scenario shown in FIG. 2 is still used as an example. When the service data is to be sent to the watch, the mobile phone determines the interaction channel corresponding to the service (which is a service corresponding to the service data).

For example, when a message is to be sent to the watch, the mobile phone determines that the corresponding interaction channel is the dynamic Bluetooth logical channel.

For another example, when music is to be sent to the watch, the mobile phone determines that the corresponding interaction channel is the first Bluetooth logical channel.

304A: If the interaction channel corresponding to the service is the dynamic logical channel, the first electronic device sends a status query instruction to the second main control chip through the second logical channel.

The application scenario shown in FIG. 2 is still used as an example. When the message is to be sent to the watch, the corresponding interaction channel is the dynamic Bluetooth logical channel, and the mobile phone sends the status query instruction to the MCU through the second Bluetooth logical channel.

305: The second main control chip returns status information of the first main control chip and the second main control chip to the first electronic device.

After receiving the status query instruction, the second main control chip queries the status information of the first main control chip and the second main control chip.

The second main control chip may query the status information of the first main control chip through a dual-core service of the second electronic device, and may query the status information of the second main control chip from a status machine of the second main control chip.

The application scenario shown in FIG. 2 is still used as an example. The MCU returns status information of the AP and the MCU to the mobile phone.

In an embodiment of this application, a status of the first main control chip includes a running state and a sleep state, and a status of the second main control chip includes a high-load state and a non-high-load state.

The status information of the first main control chip and the second main control chip that is returned by the second main control chip to the first electronic device may be the statuses of the first main control chip and the second main control chip. Alternatively, the status information of the first main control chip and the second main control chip that is returned by the second main control chip to the first electronic device may be running parameters (for example, processor usage) of the first main control chip and the second main control chip, and the first electronic device determines the statuses of the first main control chip and the second main control chip based on the status information of the first main control chip and the second main control chip.

If the first main control chip is in the running state, it indicates that the first main control chip is processing a service. If the first main control chip is in the sleep state, it indicates that the first main control chip is not processing a service.

If the second main control chip is in the high-load state, it indicates that current load of the second main control chip is heavy. If the second main control chip is in the non-high-load state, it indicates that current load of the second main control chip is light.

Option 1: 306A: If the first main control chip is in the sleep state and the second main control chip is in the non-high-load state, the first electronic device sends the service data to the second main control chip through the second logical channel.

The application scenario shown in FIG. 2 is still used as an example. If the AP is in the sleep state and the MCU is in the non-high-load state, the mobile phone sends the service data to the MCU through the second Bluetooth logical channel.

Option 2: 306B: If the first main control chip is in the running state, the first electronic device sends the service data to the first main control chip through the first logical channel.

The application scenario shown in FIG. 2 is still used as an example. If the AP is in the running state, the first electronic device sends the service data to the AP through the first Bluetooth logical channel.

Option 3: 306C: If the first main control chip is in the sleep state and the second main control chip is in the high-load state, the first electronic device temporarily stores the service data.

The application scenario shown in FIG. 2 is still used as an example. If the AP is in the sleep state and the MCU is in the high-load state, the mobile phone temporarily stores the service data.

304B: If the interaction channel corresponding to the service is the first logical channel, the first electronic device sends the service data to the first main control chip through the first logical channel.

The application scenario shown in FIG. 2 is still used as an example. If the interaction channel corresponding to the service is the first Bluetooth logical channel, the mobile phone sends the service data to the AP through the first Bluetooth logical channel.

For example, the service data to be sent by the mobile phone is music, and the corresponding interaction channel is the first Bluetooth logical channel. The mobile phone sends the music to the AP through the first Bluetooth logical channel.

304C: If the interaction channel corresponding to the service is the second logical channel, the first electronic device sends the service data to the second main control chip through the second logical channel.

The application scenario shown in FIG. 2 is still used as an example. If the interaction channel corresponding to the service is the second Bluetooth logical channel, the mobile phone sends the service data to the MCU through the second Bluetooth logical channel.

For example, the service data to be sent by the mobile phone is the another service, and the corresponding interaction channel is the second Bluetooth logical channel. The mobile phone sends the service data to the MCU through the second Bluetooth logical channel.

It should be noted that, if the interaction channel corresponding to the service is the dynamic logical channel, 304A to 306C are performed; if the interaction channel corresponding to the service is the first logical channel, 304B is performed; and if the interaction channel corresponding to the service is the second logical channel, 304C is performed.

In some embodiments of this application, after the second main control chip receives the service data (may receive the service data through 306, or may receive the service data through 310), the second main control chip determines a service processing policy corresponding to the service data. The second main control chip may determine the service processing policy based on the statuses of the first main control chip and the second main control chip, a user operation on the second electronic device, and the like. The service processing policy may include processing through the first main control chip, processing through the second main control chip, and collaborative processing through the first main control chip and the second main control chip.

In an embodiment of this application, the second main control chip monitors the status of the first main control chip and a quantity of tasks of the second main control chip, and forwards the service data to the first main control chip for processing when detecting that the first main control chip is in the running state, or a quantity of to-be-processed tasks (for example, a quantity of messages in a message buffer pool) of the second main control chip is greater than or equal to a preset quantity (for example, 10).

The application scenario shown in FIG. 2 is still used as an example. After the MCU receives the service data, if the AP is in the running state, the MCU forwards the service data to the AP for processing.

It should be noted that, if the first electronic device sends the service data to the first main control device through the second logical channel, the first main control device directly processes the service, and does not forward the service data to the second main control device for processing.

FIG. 5 is a schematic diagram of a service processing policy of a second main control chip. FIG. 5 is described by using the application scenario shown in FIG. 2 as an example.

Refer to FIG. 5. A service processing policy corresponding to exercise is: An AP performs processing if a user enables a map and an MCU performs processing if another function of the exercise is enabled. To be specific, after the MCU receives service data of the exercise (data such as a pace and a distance), if the user chooses to display a map screen on a watch, the AP performs processing, and the MCU performs processing if another function is enabled.

A service processing policy corresponding to message notification is: Within one minute after a message is received, the user raises the wrist or presses a key to turn on a screen, and the MCU displays the message in full screen. After one minute after the message is received, the user needs to enter a message center of the AP to view the message, and the AP performs processing. In other words, after the MCU receives the message, if the user raises the wrist or presses the key within one minute to turn on the screen, the MCU performs processing and displays the message in full screen. If the user views the message after one minute, the user needs to enter the message center of the AP, and the AP performs processing.

Figure 6:
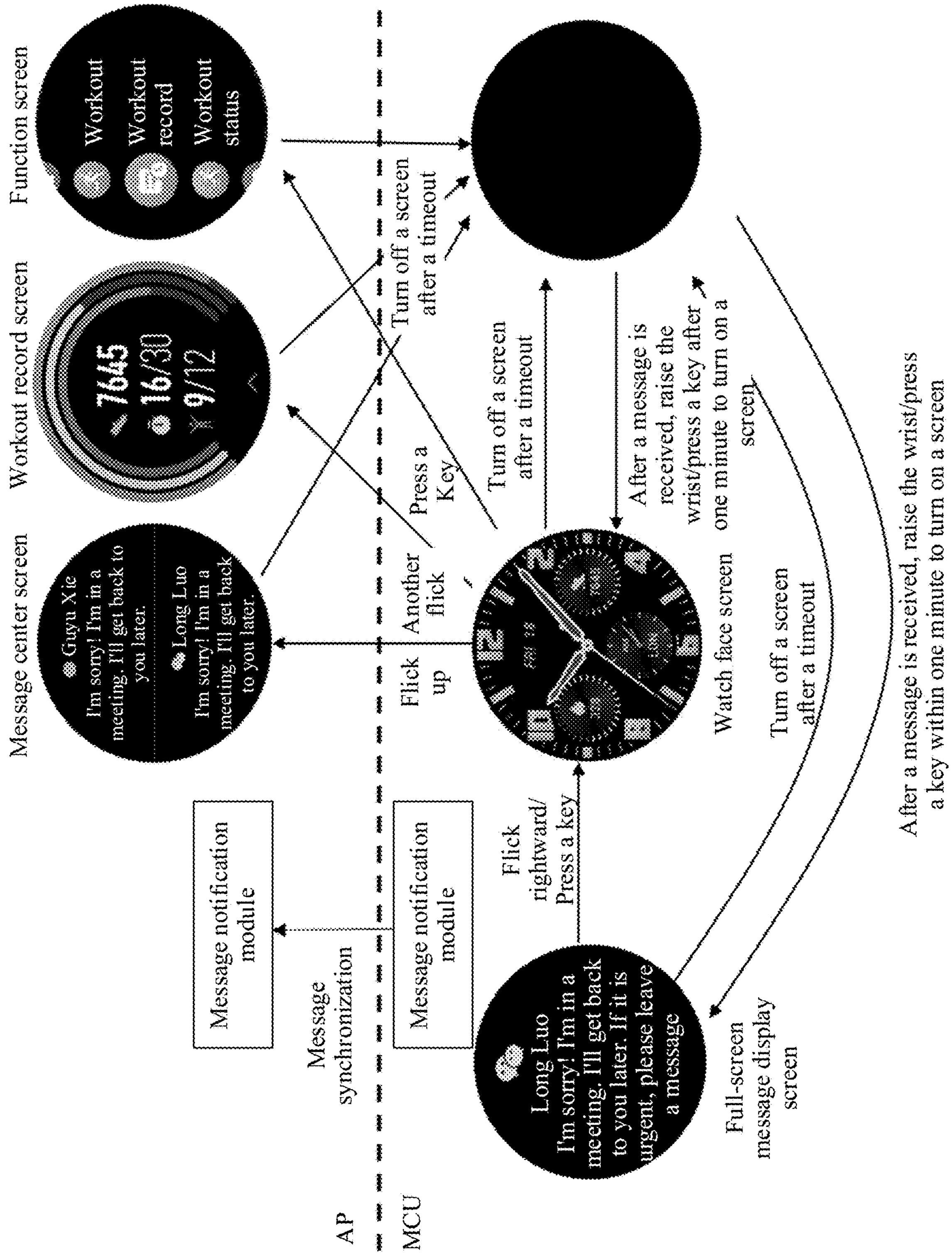
FIG. 6 is a schematic diagram of performing, by a micro control unit of a watch after receiving a message sent by a mobile phone, service processing according to a service processing policy corresponding to a message notification service.

FIG. 6 is a schematic diagram of performing, by a micro control unit of a watch after receiving a message sent by a mobile phone, service processing according to a service processing policy corresponding to a message notification service.

As shown in FIG. 6, after receiving the message sent by the mobile phone, the MCU of the watch determines whether to display the message by an AP or the MCU. Within one minute after the message is received, if a user raises the wrist or presses a key to turn on a screen, the MCU displays the message in full screen and displays a full-screen message display screen. After one minute after the message is received, if the user raises the wrist or presses the key to turn on the screen, the MCU displays a watch face screen. If the user flicks up the watch face screen, the watch enters a message center screen from the watch face screen, and the AP displays the message on the message center screen. When the user performs another flick gesture on the watch face screen, the watch may enter a workout record screen from the watch face screen. When the user presses a key on the watch face screen, the watch may enter a function screen from the watch face screen. When the user does not perform any operation on the full-screen message display screen, the watch face screen, the message center screen, the workout record screen, or the function screen within a timeout limit, the watch screen is turned off.

In a message pushing scenario, the AP does not need to be frequently woken up and running. If the mobile phone pushes 100 messages to the watch every day, standby time of the watch can be increased by 0.4 days.

In an embodiment of this application, when the MCU monitors and detects that the AP is in a running state, or a quantity of messages in a message buffer pool of the MCU is greater than or equal to a preset quantity (for example, 10), the messages are synchronized to the AP (which is shown in the figure and is implemented by using message notification modules of the AP and the MCU).

Figure 7:
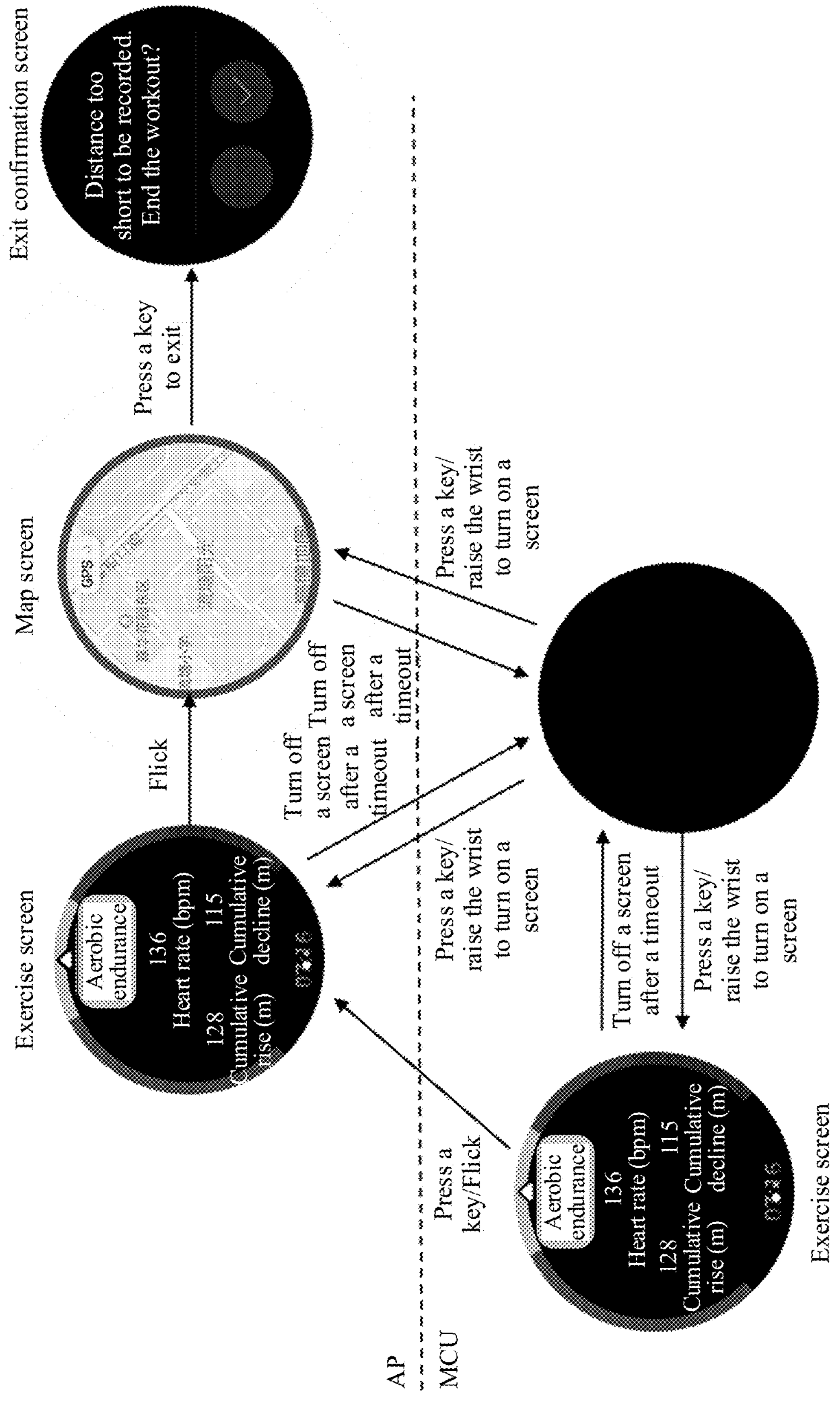
FIG. 7 is a schematic diagram of performing, by a micro control unit of a watch after receiving a pace and a distance sent by a mobile phone, service processing according to a service processing policy corresponding to an exercise service.

FIG. 7 is a schematic diagram of performing, by a micro control unit of a watch after receiving a pace and a distance sent by a mobile phone, service processing according to a service processing policy corresponding to an exercise service.

In an embodiment of this application, the mobile phone (for example, a device management application 202 of the mobile phone in FIG. 2) starts the exercise service, and sends an exercise starting notification to the MCU through a second Bluetooth logical channel. After receiving the exercise starting notification, the MCU displays an exercise screen, monitors a user operation, and determines whether the AP or the MCU displays exercise information. In an exercise process, the MCU of the watch sends, to the mobile phone through the second Bluetooth logical channel, data such as a heart rate, blood pressure, and a body temperature that are sensed by the watch, and the mobile phone sends data such as a pace and a distance to the MCU through the second Bluetooth logical channel. A user can view all exercise data on the watch and the mobile phone and control a pause, a resume, and an end of exercise.

As shown in FIG. 7, after receiving the exercise starting notification, the MCU displays the exercise screen. When the user presses a key or flicks on the exercise screen, the AP is woken up and the exercise screen is switched to be displayed through the AP. When the user flicks on the exercise screen displayed by the AP, the AP displays a map screen. When the user presses a key on the map screen to exit, the AP displays an exit confirmation screen. When the user does not perform any operation within a timeout limit, the MCU turns off the screen. When the user raises the wrist or presses a key to turn on the screen, the watch returns to the screen that is displayed before the screen is turned off.

In a connected exercise scenario, standby time of the watch can be increased by 0.2 days based on one-hour exercise per day.

The service data transmission method provided in this application is applied to the first electronic device and the second electronic device that perform the distributed collaborative service. The first electronic device determines a channel for transmitting the service data by the first electronic device to the second electronic device, to reduce a quantity of times of waking up a main control chip with high energy consumption in the second electronic device and improve standby time of the second electronic device.

Figure 8:
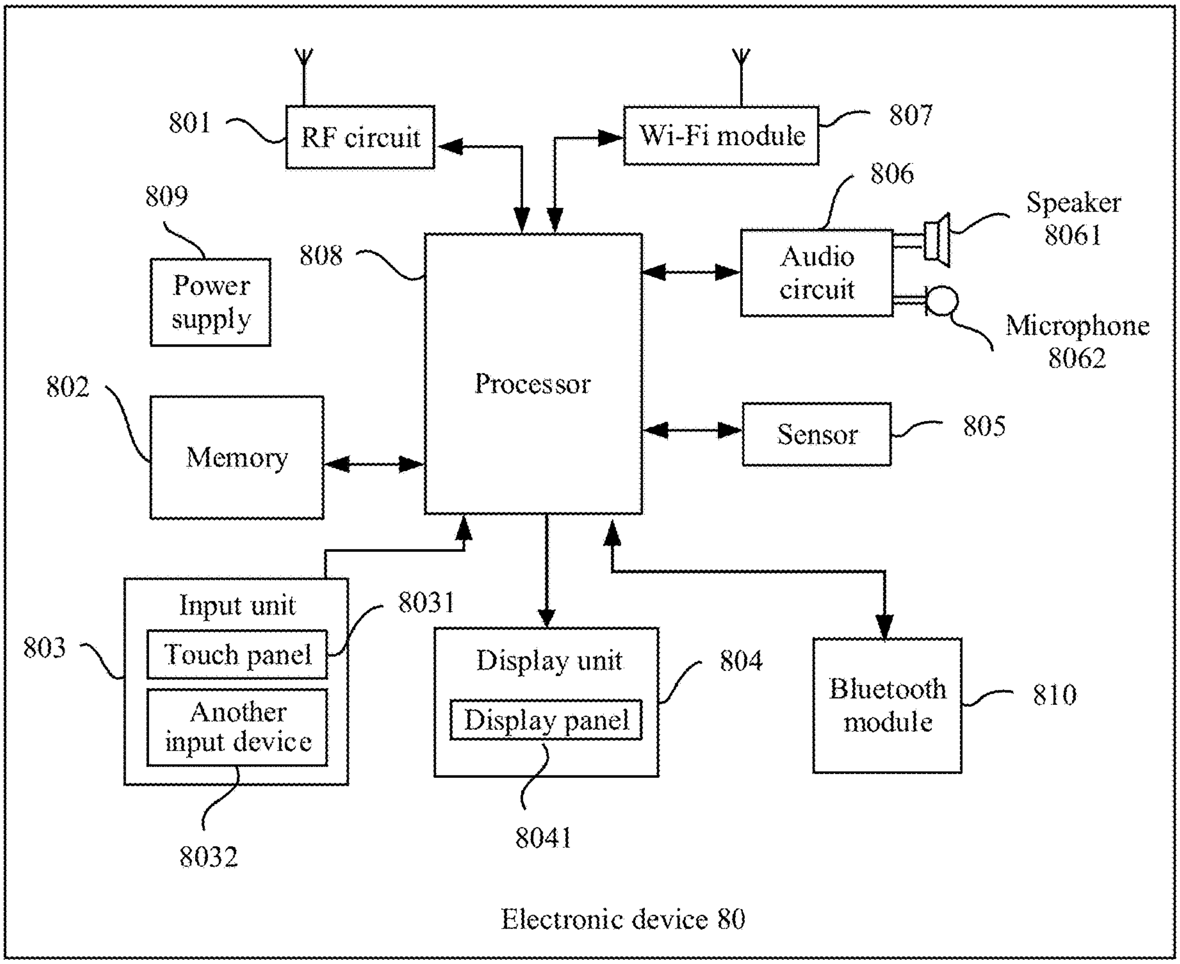
FIG. 8 is a schematic diagram of a structure of an electronic device according to an embodiment of this application.

FIG. 8 is a schematic diagram of a structure of an electronic device (a first electronic device or a second electronic device) according to an embodiment of this application. As shown in FIG. 8, the electronic device 80 may include components of a radio frequency (Radio Frequency, RF) circuit 801, a memory 802, an input unit 803, a display unit 804, a sensor 805, an audio circuit 806, a Wi-Fi module 807, a processor 808, a power supply 809, a Bluetooth module 810, and the like. A person skilled in the art may understand that the structure shown in FIG. 8 does not constitute a limitation on the electronic device, and the electronic device may include more or fewer components than those shown in the figure, or combine some components combined, or have different arrangements.

The RF circuit 801 may be configured to receive and send a signal in an information receiving and sending process or in a call process. Particularly, downlink information of a base station is received and then transferred to the processor 808 for processing. In addition, related uplink data is sent to the base station. Usually, the RF circuit 801 includes but is not limited to an antenna, at least one amplifier, a transceiver, a coupler, a low noise amplifier (Low Noise Amplifier, LNA), a duplexer, and the like.

The memory 802 may be configured to store a software program and a module. The processor 808 runs the software program and the module that are stored in the memory 802, to execute various function applications and perform data processing of the electronic device. The memory 802 may mainly include a program storage area and a data storage area, where the program storage area may store an operating system, an application required for at least one function (such as a sound play function and an image play function), and the like, and the data storage area may store data created based on usage of the electronic device (such as audio data and a phone book), and the like. In addition, the memory 802 may include a high-speed random access memory, and may further include a non-volatile memory such as at least one magnetic disk storage device, a flash memory device, or another volatile solid-state storage device.

The input unit 803 may be configured to: receive input digit or character information, and generate a key signal input related to a user setting and function control of the electronic device. Specifically, the input unit 803 may include a touch panel 8031 and another input device 8032. The touch panel 8031, also referred to as a touchscreen, may collect a touch operation of a user on or near the touch panel 8031 (for example, an operation of the user on or near the touch panel 8031 by using any suitable object or accessory, for example, a finger or a stylus pen), and drive a corresponding connection apparatus based on a preset program. Optionally, the touch panel 8031 may include two parts: a touch detection apparatus and a touch controller. The touch detection apparatus detects a touch location of the user, detects a signal along with a touch operation, and transfers the signal to the touch controller. The touch controller receives touch information from the touch detection apparatus, converts the touch information to touch point coordinates, sends the touch point coordinates to the processor 808, and receives and executes a command sent by the processor 808. In addition, the touch panel 8031 may be implemented in a plurality of types: a resistive type, a capacitive type, an infrared type, a surface acoustic wave type, and the like. In addition to the touch panel 8031, the input unit 803 may further include the another input device 8032. Specifically, the another input device 8032 may include, but is not limited to, one or more of a physical keyboard, a functional key (for example, a volume control key or an on/off key), a trackball, a mouse, a joystick, and the like.

The display unit 804 may be configured to display information entered by the user, information provided for the user, and various menus of the electronic device. The display unit 804 may include a display panel 8041. Optionally, the display panel 8041 may be configured in a form of a liquid crystal display (Liquid Crystal Display, LCD), an organic light-emitting diode (Organic Light-Emitting Diode, OLED), or the like. Further, the touch panel 8031 may cover the display panel 8041. After detecting a touch operation on or near the touch panel 8031, the touch panel 8031 transfers the touch operation to the processor 808, to determine a type of a touch event. Subsequently, the processor 808 provides a corresponding visual output to the display panel 8041 based on the type of the touch event. Although the touch panel 8031 and the display panel 8041 are used as two separate components to implement input and output functions of the electronic device in FIG. 8, in some embodiments, the touch panel 8031 and the display panel 8041 may be integrated to implement the input and output functions of the electronic device.

The electronic device may further include at least one type of sensor 805, for example, a light sensor, a motion sensor, and another sensor. Specifically, the light sensor may include an ambient light sensor and a proximity sensor, where the ambient light sensor may adjust brightness of the display panel 8041 based on intensity of ambient light and the proximity sensor may turn off the display panel 8041 and/or backlight when the electronic device moves close to an ear. As a type of the motion sensor, an accelerometer sensor may detect values of acceleration in various directions (where there are usually three axes), may detect a value and a direction of gravity when the electronic device is stationary, and may be configured for an application of recognizing a posture of the electronic device (for example, landscape/portrait mode switching, a related game, or magnetometer posture calibration), a vibration recognition related function (for example, a pedometer or a stroke), and the like. In addition, other sensors may be disposed for the electronic device, such as a gyroscope, a barometer, a hygrometer, a thermometer, an infrared sensor, and the like. Details are not described herein again.

The audio circuit 806, a speaker 8061, and a microphone 8062 may provide an audio interface between the user and the electronic device. The audio circuit 806 can transmit, to the speaker 8061, an electrical signal converted from received audio data, and the speaker 8061 converts the electrical signal to a sound signal for outputting. In another aspect, the microphone 8062 converts a collected sound signal to an electrical signal, and the audio circuit 806 receives the electrical signal and then converts the electrical signal to audio data. Then the audio data is output to the processor 808 for processing and sent to another electronic device through the RF circuit 801; or the audio data is output to the memory 802 for further processing.

Wi-Fi is a short-range wireless transmission technology. The electronic device may help, through the Wi-Fi module 807, the user receive and send an email, browse a web page, access streaming media, and the like, and provide wireless broadband Internet access for the user. Although FIG. 8 shows the Wi-Fi module 807, it may be understood that the Wi-Fi module 807 is not a mandatory component of the electronic device, and may be omitted based on a requirement without changing the essence of this invention.

As a control center of the electronic device, the processor 808 connects to various parts of the entire electronic device through various interfaces and lines, performs various functions and data processing of the electronic device by running or executing a software program and/or a module stored in the memory 802 and invokes data stored in the memory 802, to perform overall monitoring on the electronic device.

The processor 808 may include one or more processing units. For example, the processor 808 may include an application processor (application processor, AP), a micro control unit (Micro Control Unit, MCU), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The processor 808 may integrate the application processor and the modem processor, where the application processor mainly processes an operating system, a user interface, an application, and the like, and the modem processor mainly processes wireless communication. It may be understood that the modem processor may alternatively not be integrated into the processor 808.

The electronic device further includes the power supply 809 (for example, a battery) that supplies power for various components. Optionally, the power supply may be logically connected to the processor 808 by using a power management system, to implement functions such as charging management, discharging management, power consumption management, and the like by using the power management system.

A Bluetooth module is a Bluetooth chip, and the Bluetooth module 810 communicates, by using a Bluetooth protocol, with another electronic device having a Bluetooth function.

Although not shown, the electronic device may further include a camera and the like, and details are not described herein again.

The electronic device described in FIG. 8 may be configured to implement some or all procedures in a method embodiment described in FIG. 3 of this application. For details, refer to related descriptions in the embodiment in FIG. 3. Details are not described herein again.

An embodiment further provides a computer storage medium. The computer storage medium stores computer instructions. When the computer instructions are run on an electronic device, the electronic device is enabled to perform the foregoing related method steps, to implement the service data transmission method in the foregoing embodiments.

An embodiment further provides a computer program product. When the computer program product runs on an electronic device, the electronic device is enabled to perform the foregoing related steps, to implement the service data transmission method in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the service data transmission method in the foregoing method embodiments.

The electronic device, the computer storage medium, the computer program product, or the chip provided in embodiments are all configured to perform the corresponding method provided above. Therefore, for beneficial effects that can be achieved, refer to the beneficial effects of the corresponding method provided above. Details are not described herein again.

Based on descriptions of the foregoing implementations, a person skilled in the art may clearly understand that for a purpose of convenient and brief descriptions, division into the foregoing functional modules is merely used as an example for description. During actual application, the functions may be allocated to different functional modules for implementation based on a requirement. In other words, an inner structure of the apparatus is divided into different functional modules to implement all or some of the functions described above.

In the several embodiments provided in this application, it should be understood that the disclosed apparatus and method may be implemented in other manners. For example, the apparatus embodiments described above are merely examples. For example, division into the module or unit is merely a logical function division, and may be other division during an actual implementation. For example, a plurality of units or components may be combined or may be integrated into another apparatus, or some features may be ignored or not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed to different places. Some or all of the units may be selected based on an actual requirement to achieve the objectives of the solutions of embodiments.

In addition, functional units in embodiments of this application may be integrated into one processing unit. Each of the units may also exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in the form of a software product. The software product is stored in a storage medium and includes several instructions for enabling a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, an optical disc, or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A service data transmission method, applied to a mobile phone, wherein the method comprises:

establishing a first Bluetooth logical channel with a first main control chip of a wearable device;

establishing a second Bluetooth logical channel with a second main control chip of the wearable device, wherein the first main control chip and the second main control chip have different processing capabilities and different energy consumption; and while both the first Bluetooth logical channel and the second Bluetooth logical channel are established, sending, based on an interaction channel corresponding to a service, service data to the first main control chip through the first Bluetooth logical channel or to the second main control chip through the second Bluetooth logical channel, wherein a data processing capability of the second main control chip is different from a data processing capability of the first main control chip;

wherein sending, based on the interaction channel corresponding to the service, the service data to the first main control chip through the first Bluetooth logical channel or to the second main control chip through the second Bluetooth logical channel comprises:

when the interaction channel corresponding to the service is a dynamic Bluetooth logical channel, sending the service data to the first main control chip through the first Bluetooth logical channel or to the second main control chip through the second Bluetooth logical channel based on a status of the first main control chip and a status of the second main control chip;

when the interaction channel corresponding to the service is the first Bluetooth logical channel, sending the service data to the first main control chip through the first Bluetooth logical channel; and when the interaction channel corresponding to the service is the second Bluetooth logical channel, sending the service data to the second main control chip through the second Bluetooth logical channel.

2. The service data transmission method according to claim 1, wherein before sending, based on the interaction channel corresponding to the service, the service data to the first main control chip through the first Bluetooth logical channel or to the second main control chip through the second Bluetooth logical channel, the method further comprises:

receiving an interaction channel policy sent by the second main control chip through the second Bluetooth logical channel; and determining, according to the interaction channel policy, the interaction channel corresponding to the service.

3. The service data transmission method according to claim 1, wherein if the interaction channel corresponding to the service is the dynamic Bluetooth logical channel, the method further comprises:

sending a status query instruction to the second main control chip through the second Bluetooth logical channel; and receiving status information of the first main control chip and status information of the second main control chip that are returned by the second main control chip.

4. The service data transmission method according to claim 1, wherein sending the service data to the first main control chip through the first Bluetooth logical channel or to the second main control chip through the second Bluetooth logical channel based on the status of the first main control chip and the status of the second main control chip comprises:

when the first main control chip is in a sleep state and the second main control chip is in a non-high-load state, sending the service data to the second main control chip through the second Bluetooth logical channel;

when the first main control chip is in a running state, sending the service data to the first main control chip through the first Bluetooth logical channel; and when the first main control chip is in the sleep state and the second main control chip is in a high-load state, temporarily storing the service data.

5. The service data transmission method according to claim 1, wherein establishing the first Bluetooth logical channel with the first main control chip of the wearable device and establishing the second Bluetooth logical channel with the second main control chip of the wearable device comprises:

establishing a physical channel with the first main control chip;

establishing the first Bluetooth logical channel with the first main control chip, wherein the first Bluetooth logical channel has a first channel number;

receiving a second channel number sent by the first main control chip, wherein the second channel number identifies the second Bluetooth logical channel generated by the second main control chip; and connecting to the second Bluetooth logical channel based on the second channel number.

6. The service data transmission method according to claim 1, wherein the first main control chip is an application processor, and the second main control chip is a micro control processor.

7. A service data transmission method, applied to a wearable device, wherein the wearable device comprises a first main control chip and a second main control chip, the first main control chip and the second main control chip have different processing capabilities and different energy consumption, and the method comprises:

establishing a first Bluetooth logical channel between the first main control chip and a mobile phone;

establishing a second Bluetooth logical channel between the second main control chip and the mobile phone;

while both the first Bluetooth logical channel and the second Bluetooth logical channel are established, receiving service data sent by the mobile phone to the first main control chip through the first Bluetooth logical channel or to the second main control chip through the second Bluetooth logical channel;

when receiving the service data sent by the mobile phone to the first main control chip through the first Bluetooth logical channel, processing, by the first main control chip, the service data; and when receiving the service data sent by the mobile phone to the second main control chip through the second Bluetooth logical channel, determining, by the second main control chip, a service processing policy corresponding to the service data.

8. The service data transmission method according to claim 7, wherein determining the service processing policy corresponding to the service data comprises:

determining the service processing policy based on at least one of a user operation on the wearable device or statuses of the first main control chip and the second main control chip.

9. The service data transmission method according to claim 8, wherein determining the service processing policy based on at least one of the user operation on the wearable device or the statuses of the first main control chip and the second main control chip comprises:

when the first main control chip is in a running state or a quantity of to-be-processed tasks of the second main control chip is greater than or equal to a preset quantity, forwarding the service data to the first main control chip for processing.

10. The service data transmission method according to claim 8, wherein the service data is a message, and determining the service processing policy based on at least one of the user operation on the wearable device or the statuses of the first main control chip and the second main control chip comprises:

entering a message center of the first main control chip if detecting that a user views the message after a preset time after the message is received; and displaying, by the second main control chip, the message in full screen if detecting that the user wakes a screen of the wearable device within the preset time after the message is received.

11. The service data transmission method according to claim 8, wherein the service data is exercise data, and determining the service processing policy based on at least one of the user operation on the wearable device or the statuses of the first main control chip and the second main control chip comprises:

when detecting that a user enables a map, processing, by the first main control chip, the exercise data; and when detecting that the user enables an exercise function, processing, by the second main control chip, the exercise data.

12. A mobile phone, wherein the mobile phone comprises:

at least one processor, and at least one memory coupled to the at least one processor and storing programming instructions for execution by the at least one processor to perform operations comprising:

establishing a first Bluetooth logical channel with a first main control chip of a wearable device;

establishing a second Bluetooth logical channel with a second main control chip of the wearable device, wherein the first main control chip and the second main control chip have different processing capabilities and different energy consumption; and while both the first Bluetooth logical channel and the second Bluetooth logical channel are established, sending, based on an interaction channel corresponding to a service, service data to the first main control chip through the first Bluetooth logical channel or to the second main control chip through the second Bluetooth logical channel, wherein a data processing capability of the second main control chip is different from a data processing capability of the first main control chip;

wherein sending, based on the interaction channel corresponding to the service, the service data to the first main control chip through the first Bluetooth logical channel or to the second main control chip through the second Bluetooth logical channel comprises:

when the interaction channel corresponding to the service is a dynamic Bluetooth logical channel, sending the service data to the first main control chip through the first Bluetooth logical channel or to the second main control chip through the second Bluetooth logical channel based on a status of the first main control chip and a status of the second main control chip;

when the interaction channel corresponding to the service is the first Bluetooth logical channel, sending the service data to the first main control chip through the first Bluetooth logical channel; and when the interaction channel corresponding to the service is the second Bluetooth logical channel, sending the service data to the second main control chip through the second Bluetooth logical channel.

13. The mobile phone according to claim 12, wherein before sending, based on the interaction channel corresponding to the service, the service data to the first main control chip through the first Bluetooth logical channel or to the second main control chip through the second Bluetooth logical channel, the operations comprise:

receiving an interaction channel policy sent by the second main control chip through the second Bluetooth logical channel; and determining, according to the interaction channel policy, the interaction channel corresponding to the service.

14. The mobile phone according to claim 12, wherein if the interaction channel corresponding to the service is the dynamic Bluetooth logical channel, the operations comprise:

sending a status query instruction to the second main control chip through the second Bluetooth logical channel; and receiving status information of the first main control chip and status information of the second main control chip that are returned by the second main control chip.

15. The mobile phone according to claim 12, wherein sending the service data to the first main control chip through the first Bluetooth logical channel or to the second main control chip through the second Bluetooth logical channel based on the status of the first main control chip and the status of the second main control chip comprises:

when the first main control chip is in a sleep state and the second main control chip is in a non-high-load state, sending the service data to the second main control chip through the second Bluetooth logical channel;

when the first main control chip is in a running state, sending the service data to the first main control chip through the first Bluetooth logical channel; and when the first main control chip is in the sleep state and the second main control chip is in a high-load state, temporarily storing the service data.

16. The mobile phone according to claim 12, wherein establishing the first Bluetooth logical channel with the first main control chip of the wearable device and establishing the second Bluetooth logical channel with the second main control chip of the wearable device comprises:

establishing a physical channel with the first main control chip;

establishing the first Bluetooth logical channel with the first main control chip, wherein the first Bluetooth logical channel has a first channel number;

receiving a second channel number sent by the first main control chip, wherein the second channel number identifies the second Bluetooth logical channel generated by the second main control chip; and connecting to the second Bluetooth logical channel based on the second channel number.

17. The mobile phone according to claim 12, wherein the first main control chip is an application processor, and the second main control chip is a micro control processor.

18. A wearable device, wherein the wearable device comprises a first main control chip and a second main control chip, the first main control chip and the second main control chip have different processing capabilities and different energy consumption, and the wearable device is configured to perform operations comprising:

establishing a first Bluetooth logical channel between the first main control chip and a mobile phone;

establishing a second Bluetooth logical channel between the second main control chip and the mobile phone; and while both the first Bluetooth logical channel and the second Bluetooth logical channel are established, receiving service data sent by the mobile phone to the first main control chip through the first Bluetooth logical channel or to the second main control chip through the second Bluetooth logical channel;

when receiving the service data sent by the mobile phone to the first main control chip through the first Bluetooth logical channel, processing, by the first main control chip, the service data; and when receiving the service data sent by the mobile phone to the second main control chip through the second Bluetooth logical channel, determining, by the second main control chip, a service processing policy corresponding to the service data.

19. The wearable device according to claim 18, wherein determining the service processing policy corresponding to the service data comprises:

determining the service processing policy based on at least one of a user operation on the wearable device or statuses of the first main control chip and the second main control chip.

20. The wearable device according to claim 19, wherein determining the service processing policy based on at least one of the user operation on the wearable device or the statuses of the first main control chip and the second main control chip comprises:

when the first main control chip is in a running state or a quantity of to-be-processed tasks of the second main control chip is greater than or equal to a preset quantity, forwarding the service data to the first main control chip for processing.

* * * * *